(12) United States Patent
Takeuchi et al.

(10) Patent No.: US 11,741,597 B2
(45) Date of Patent: Aug. 29, 2023

(54) INSPECTION DEVICE, IMAGE FORMING APPARATUS, AND NON-TRANSITORY COMPU TER READABLE MEDIUM STORING INSPECTION PROGRAM

(71) Applicant: FUJIFILM Business Innovation Corp., Tokyo (JP)

(72) Inventors: Rina Takeuchi, Kanagawa (JP); Daigo Hama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 4 days.

(21) Appl. No.: 17/338,692

(22) Filed: Jun. 4, 2021

(65) Prior Publication Data

US 2022/0172333 A1 Jun. 2, 2022

(30) Foreign Application Priority Data

Nov. 30, 2020 (JP) ................................ 2020-198467

(51) Int. Cl.
| | |
|---|---|
| *G06K 15/00* | (2006.01) |
| *G06T 7/00* | (2017.01) |
| *G06T 7/32* | (2017.01) |
| *G06T 7/13* | (2017.01) |

(52) U.S. Cl.
CPC ............ *G06T 7/001* (2013.01); *G06K 15/408* (2013.01); *G06T 7/13* (2017.01); *G06T 7/32* (2017.01); *G06T 2207/10008* (2013.01); *G06T 2207/20021* (2013.01); *G06T 2207/30144* (2013.01)

(58) Field of Classification Search
None
See application file for complete search history.

(56) References Cited

U.S. PATENT DOCUMENTS

| | | | |
|---|---|---|---|
| 11,379,962 B2* | 7/2022 | Mimura | G06T 7/0002 |
| 2001/0053245 A1* | 12/2001 | Sakai | G06T 7/32 |
| | | | 382/218 |
| 2003/0179921 A1* | 9/2003 | Sakai | G06T 7/32 |
| | | | 382/151 |
| 2006/0082837 A1* | 4/2006 | Hiroe | H04N 1/00973 |
| | | | 358/448 |
| 2012/0057795 A1* | 3/2012 | Konishi | G06V 10/243 |
| | | | 382/195 |
| 2014/0341437 A1* | 11/2014 | Araki | G06T 7/0008 |
| | | | 382/112 |
| 2015/0078627 A1* | 3/2015 | Fukase | G06T 7/001 |
| | | | 382/112 |
| 2015/0269719 A1* | 9/2015 | Kitai | G06T 7/001 |
| | | | 358/474 |
| 2021/0264581 A1* | 8/2021 | Ishii | G06K 15/027 |

FOREIGN PATENT DOCUMENTS

JP 2013186562 9/2013

* cited by examiner

*Primary Examiner* — Dung D Tran
(74) *Attorney, Agent, or Firm* — JCIPRNET

(57) ABSTRACT

An inspection device includes a processor configured to acquire image information of each of a correct image and a target image as an inspection target, divide each of the correct image and the target image into blocks and perform alignment for each of the blocks by using the acquired image information, and set a region including a movement amount of the alignment as a block and detect a defect by collating the correct image and the target image for each block.

20 Claims, 10 Drawing Sheets

CORRECT IMAGE

TARGET IMAGE

| -3.0 | 0 |

INFORMATION CORRESPONDING TO 3 PIXELS ARE OVERLOOKED

CORRECT IMAGE

TARGET IMAGE

| -3.0 | 0 |

CORRECT IMAGE  TARGET IMAGE

INFORMATION
CORRESPONDING TO 
3 PIXELS DISAPPEARS

DISAPPEARING IMAGE

COLLATION WITH
BLOCK INCLUDING 
ALIGNMENT
MOVEMENT AMOUNT

INSPECTION DEVICE, IMAGE FORMING APPARATUS, AND NON-TRANSITORY COMPU TER READABLE MEDIUM STORING INSPECTION PROGRAM

CROSS-REFERENCE TO RELATED APPLICATIONS

This application is based on and claims priority under 35 USC 119 from Japanese Patent Application No. 2020-198467 filed Nov. 30, 2020.

BACKGROUND

(i) Technical Field

The present invention relates to an inspection device, an image forming apparatus, and a non-transitory computer readable medium storing an inspection program.

(ii) Related Art

JP2013-186562A proposes an image inspection device that performs an inspection by collating an inspection target image with an original master image. The inspection target image is a read image obtained by reading an image output after being formed on a paper surface by an image forming apparatus. In detail, the image inspection apparatus includes an inspection comparison unit that performs comparison collation in a manner as follows. That is, the inspection comparison unit divides the entirety of the image into a plurality of blocks. The inspection comparison unit performs a first alignment in a plurality of regions in an image peripheral portion and calculates a misalignment amount of each block in the inspection target image based on the result of the alignment. Then, the inspection comparison unit performs alignment between the blocks of the inspection target image, which are shifted in accordance with the misalignment amount, and the blocks of the master image while further shifting the above blocks slightly. The inspection comparison unit selects a predetermined block in the image, performs a second alignment by calculating the misalignment amount of the selected block again, and corrects the misalignment amount of each block in the inspection target image based on the result of the second alignment.

SUMMARY

In a case where a correct image is collated with a target image as an inspection target for each block, in the collation with the correct image after moving the block in the target image, an image in the left-behind block may cause decrease of defect inspection accuracy. Therefore, aspects of non-limiting embodiments of the present disclosure relate to an inspection device, an image forming apparatus, and a non-transitory computer readable medium storing an inspection program that are capable of suppressing decrease of the defect inspection accuracy in comparison to a case where, in collation between a correct image and a target image for each block, the target image is simply collated with the correct image after moving the block in the target image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

To achieve the above object, according to an aspect of the present disclosure, there is provided an inspection device including a processor configured to acquire image information of each of a correct image and a target image as an inspection target, divide each of the correct image and the target image into blocks and perform alignment for each of the blocks by using the acquired image information, and set a region including a movement amount of the alignment as a block and detect a defect by collating the correct image and the target image for each block.

BRIEF DESCRIPTION OF THE DRAWINGS

Exemplary embodiment(s) of the present invention will be described in detail based on the following figures, wherein.

DETAILED DESCRIPTION

Figure 1:
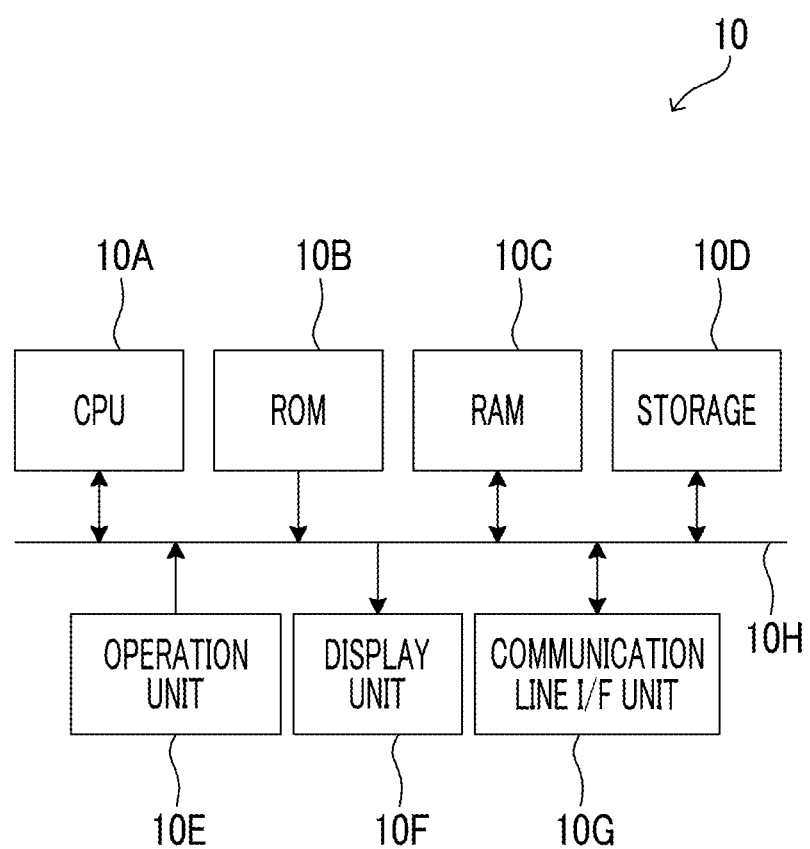
FIG. 1 is a schematic diagram illustrating a configuration of an inspection device according to a first exemplary embodiment.

Hereinafter, examples of exemplary embodiments of the present invention will be described in detail with reference to the drawings. FIG. 1 is a schematic diagram illustrating a configuration of an inspection device according to a first exemplary embodiment.

An inspection device 10 according to the present exemplary embodiment executes a process of inspecting a defect of an image by comparing a correct image with an image as an inspection target. In the following description, the image as the inspection target is referred to as a target image.

Examples of defects of an image in the present exemplary embodiment include omission of an image, addition of an image due to dust or the like, and distortion of the image, in the target image in comparison to the correct image. In the present exemplary embodiment, as an example, the inspection device 10 as follows will be described. The inspection device performs an inspection in which digital image information (for example, information obtained by converting and generating a PDL (page description language) file into a raster image) that functions as a base of image formation is used as the correct image, and image information obtained by forming an image based on the image information of the correct image and reading a recording medium such as paper is set as the target image for the inspection. Among defects of a target image, a defect in which an image which is not provided in the correct image and is provided in the target image is referred to as an addition, and a defect in which an image provided in the correct image is not provided in the target image is referred to as an omission.

The inspection device 10 includes a central processing unit (CPU) 10A as an example of a processor, a read only memory (ROM) 10B, a random access memory (RAM) 10C, a storage 10D, an operation unit 10E, a display unit 10F, and a communication line I/F (interface) unit 10G. The CPU 10A controls the overall operation of the inspection device 10. Various control programs, various parameters, and the like are stored in advance in the ROM 10B. The RAM 10C is used as a work area or the like during execution of various programs by the CPU 10A. Various types of data, application programs, and the like are stored in the storage 10D. The operation unit 10E is used to input various types of information. The display unit 10F is used to display various types of information. The communication line I/F unit 10G is connectable to an external device and transmits and receives various types of data to and from the external device. The above units of the inspection device 10 are electrically connected to each other by a system bus 10H. In the inspection device 10 according to the present exemplary embodiment, the storage 10D is applied as a storage unit, but the present invention is not limited to this. Other non-volatile storage units such as a hard disk and a flash memory may be applied.

With such a configuration, in the inspection device 10 according to the present exemplary embodiment, the CPU 10A performs accesses to the ROM 10B, the RAM 10C, and the storage 10D, acquisition of various types of data via the operation unit 10E, and display of various types of information on the display unit 10F. In the inspection device 10, the CPU 10A performs a control of transmission and reception of various types of data via the communication line I/F unit 10G.

First Exemplary Embodiment

Figure 2:
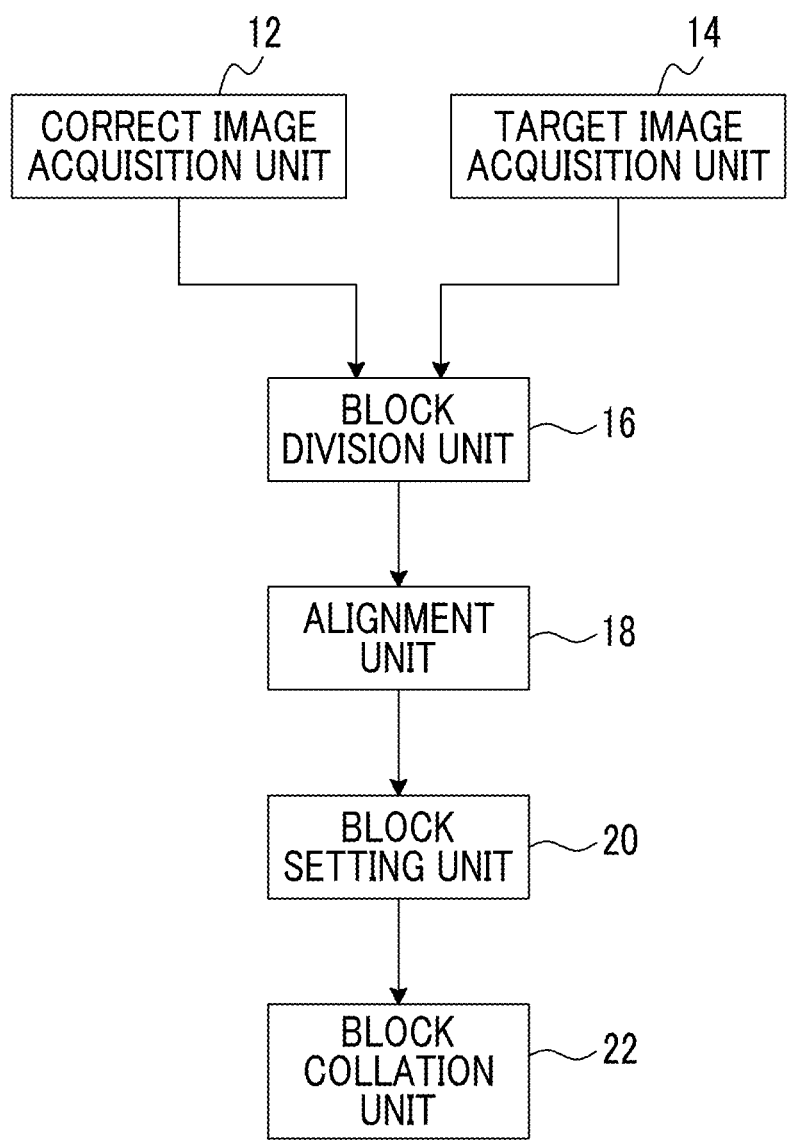
FIG. 2 is a functional block diagram illustrating a functional configuration of the inspection device according to the first exemplary embodiment.

Here, a functional configuration realized in a manner that the CPU 10A in the inspection device 10 according to a first exemplary embodiment executes a program stored in the ROM 10B will be described. FIG. 2 is a functional block diagram illustrating the functional configuration of the inspection device 10 according to the first exemplary embodiment.

As illustrated in FIG. 2, the inspection device 10 has the functions of a correct image acquisition unit 12, a target image acquisition unit 14, a block division unit 16, an alignment unit 18, a block setting unit 20, and a block collation unit 22.

The correct image acquisition unit 12 acquires a correct image as a reference for a target image. In the present exemplary embodiment, image information of a correct image generated in advance is acquired for the correct image.

The target image acquisition unit 14 acquires a target image as an inspection target. For the target image, the target image acquisition unit acquires image information indicating a target image obtained by reading a recording medium such as a paper, on which an image has been formed, based on the image information of the correct image generated in advance. In the following description, the image information indicating the correct image may be abbreviated as the correct image, and the image information indicating the target image may be abbreviated as the target image.

The block division unit 16 executes a process of dividing each of the correct image and the target image into blocks having a predetermined size.

The alignment unit 18 aligns the correct image and the target image for each block divided by the block division unit 16.

The block setting unit 20 resets a region including the movement amount of the alignment as a block, based on the alignment result of the alignment unit 18.

The block collation unit 22 executes a process of detecting a defect by collating the correct image with the target image for each block set by the block setting unit 20.

Figure 3:
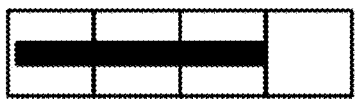
FIG. 3 is a diagram illustrating an example in which dust detection is overlooked in a technique in the related art in which collation is performed by simply dividing a correct image and a target image into blocks.
Figure 3:
Figure 3:
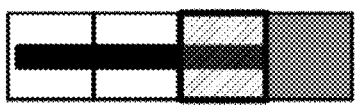
Figure 3:
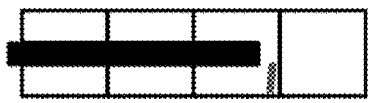
Figure 3:
Figure 3:
Figure 3:
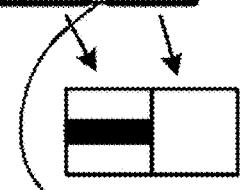

As in the related art, in a case where the correct image and the target image are simply divided into blocks and collated, the target image is moved by the misalignment of the target image, and then is collated with the correct image. Thus, in a case where there is dust or the like in the remaining block, the detection of the dust is overlooked. For example, in a case where, regarding a correct image and a target image illustrated in the first row of FIG. 3, the block of the target image is shifted from the correct image by (−3 pixels) (3 pixels in the left direction of FIG. 3) as illustrated in the second and third rows of FIG. 3, in collation after alignment for each block in order from the left side of FIG. 3, a region of 3 pixels is left behind from the rightmost block as illustrated in the third row of FIG. 3. In a case where there is an image such as dust in the left-behind region, a defect is overlooked as illustrated in the fourth and fifth rows of FIG. 3.

Figure 4:
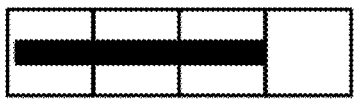
FIG. 4 is a diagram illustrating an example in which no region is left behind by setting a region including 3 pixels corresponding to a movement amount of the alignment, as a block, in the inspection device according to the first exemplary embodiment.
Figure 4:
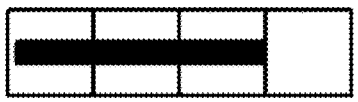
Figure 4:
Figure 4:
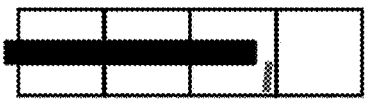
Figure 4:
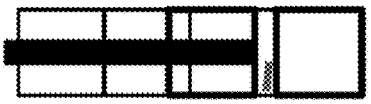
Figure 4:
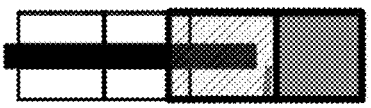
Figure 4:
Figure 4:
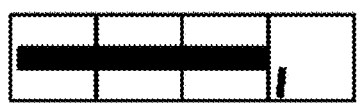

Thus, in the present exemplary embodiment, the block setting unit 20 sets a region including 3 pixels corresponding to the movement amount of the alignment, as a block based on the alignment result of each block by the alignment unit 18. In this manner, no region is left behind. For example, in a case where, regarding a correct image and a target image illustrated in the first row of FIG. 4, similarly, the block of the target image is shifted from the correct image by 3 pixels in the left direction as illustrated in the second row of FIG. 4, the block setting unit 20 resets a block including 3 pixels corresponding to the movement amount, as the block as illustrated in the third and fourth rows of FIG. 4, and then collation between the correct image and the target image is performed. Thus, as illustrated in the fifth row of FIG. 4, collation between the correct image and the target image is performed in a state where no region is left behind, and a defect such as dust is included in the rightmost block. Thus, the defect of the image is detected.

Figure 5:
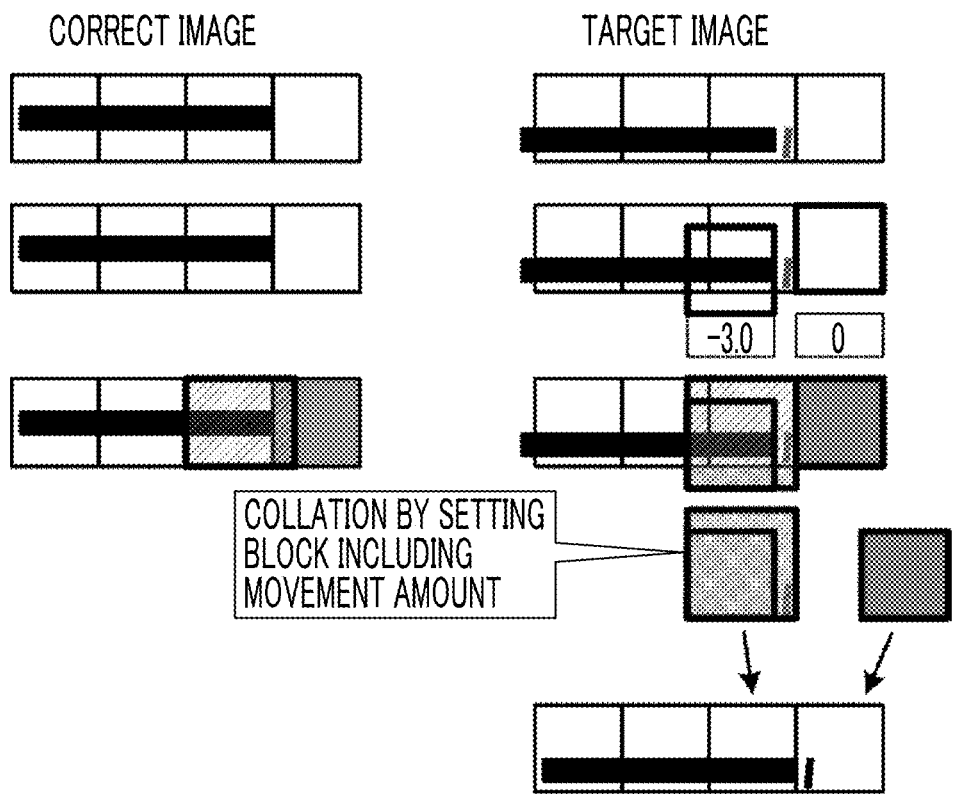
FIG. 5 is a diagram illustrating an example of resetting a block to include a movement amount of a target image in two directions in a case where the target image is shifted in the two directions.

The alignment is not limited to one direction, and may be performed in two directions on a plane. Therefore, in a case where a correct image and a target image illustrated in the first row of FIG. 5 are shifted from each other in a vertical direction in addition to a horizontal direction in FIG. 5, as illustrated in the second row of FIG. 5, the block setting unit 20 resets a block including the movement amount of the target image in the vertical direction as the block as illustrated in the third and fourth rows of FIG. 5. Thus, as in the above description, as illustrated in the fifth row of FIG. 5, no region is left behind, and overlooking a defect is prevented.

Figure 6:
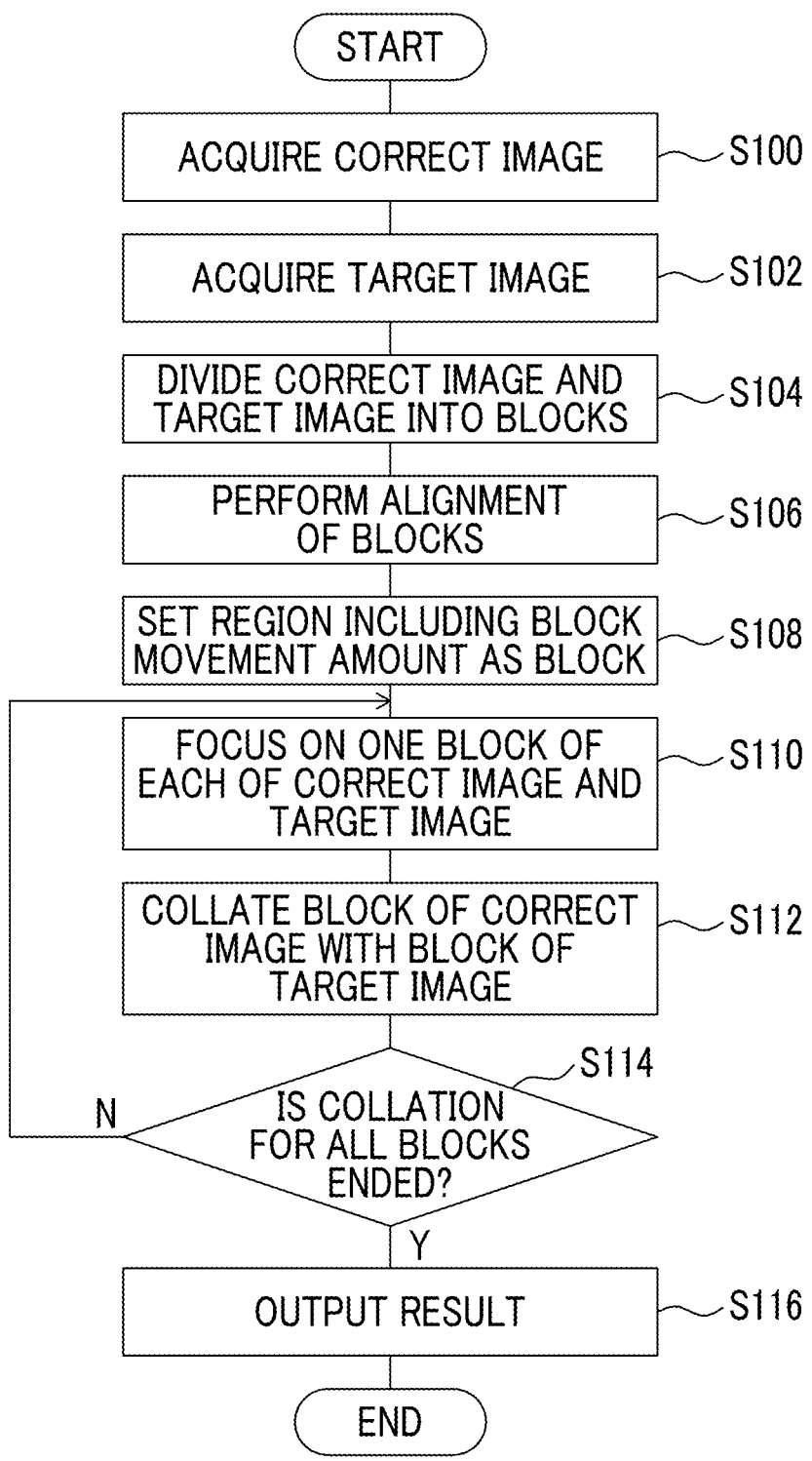
FIG. 6 is a flowchart illustrating an example of a flow of a process executed by the inspection device according to the first exemplary embodiment.

Next, a specific process executed by the inspection device 10 configured as described according to the present exemplary embodiment will be described. FIG. 6 is a flowchart illustrating an example of a flow of a process executed by the inspection device 10 according to the first exemplary embodiment. The process in FIG. 6 is started in a case where an instruction to start the inspection is issued, for example, by an operation of the operation unit 10E or the like.

In Step S100, the CPU 10A acquires a correct image and proceeds to Step S102. That is, the correct image acquisition unit 12 acquires the image information of the correct image generated in advance.

In Step S102, the CPU 10A acquires a target image and proceeds to Step S104. That is, the target image acquisition unit 14 acquires image information indicating a target image obtained by reading a recording medium such as a paper, on which an image has been formed based on the image information of the correct image generated in advance. The order of Step S100 and Step S102 may be reversed.

In Step S104, the CPU 10A divides the correct image and the target image into blocks and proceeds to Step S106. That is, the block division unit 16 executes a process of dividing each of the correct image and the target image into blocks having a predetermined size.

In Step S106, the CPU 10A aligns the blocks of the correct image and the target image, and proceeds to Step S108. That is, the alignment unit 18 aligns the correct image and the target image for each block divided by the block division unit 16.

In Step S108, the CPU 10A sets a region including the movement amount of the block by the alignment, as a block, and proceeds to Step S110. That is, the block setting unit 20 resets the region including the movement amount of the alignment as the block, based on the alignment result of the alignment unit 18.

In Step S110, the CPU 10A proceeds to Step S112 focusing on one block corresponding to each of the correct image and the target image.

In Step S112, the CPU 10A collates the block of the correct image with the block of the target image and proceeds to Step S114. That is, the block collation unit 22 executes a process of detecting a defect by collating the correct image with the target image for each block set by the block setting unit 20.

In Step S114, the CPU 10A determines whether or not the collation between the correct image and the target image for all the blocks is ended. In a case where the CPU determines that the collation for all the blocks is not ended, the process returns to Step S110 and the above process is repeated for the next block. In a case where the CPU determines that the collation for all the blocks is ended, the process proceeds to Step S116.

In Step S116, the CPU 10A outputs a defect detection result and ends a series of processes of the inspection device 10.

Second Exemplary Embodiment

Figure 7:
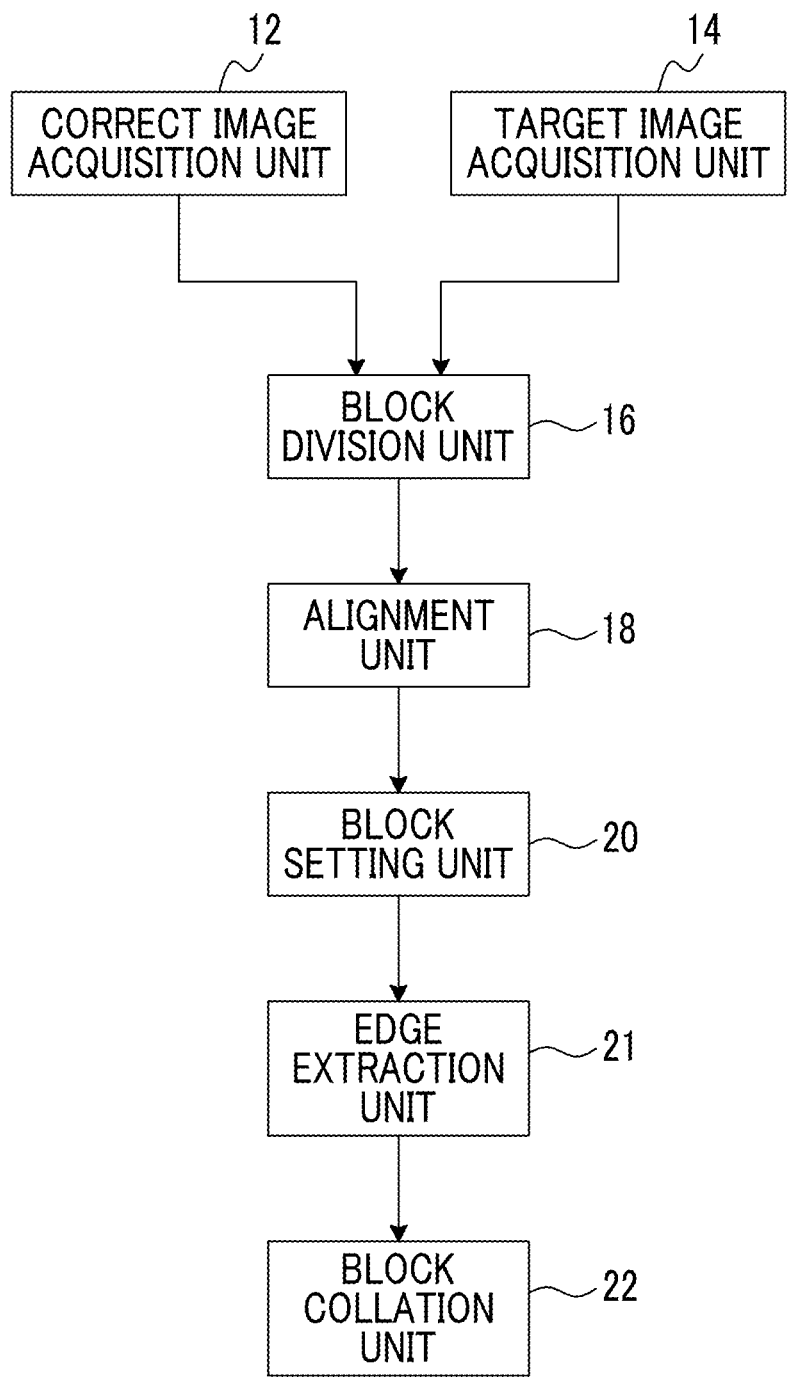
FIG. 7 is a functional block diagram illustrating a functional configuration of an inspection device according to a second exemplary embodiment.

Next, a functional configuration realized in a manner that a CPU 10A in an inspection device 10 according to a second exemplary embodiment executes a program stored in a ROM 10B will be described. FIG. 7 is a functional block diagram illustrating the functional configuration of the inspection device 10 according to the second exemplary embodiment. Since the schematic configuration of the inspection device according to the second exemplary embodiment is similar to the inspection device in the above exemplary embodiment in FIG. 1, detailed description will not be repeated. The identical reference signs are denoted by components common to the components in FIG. 2, and detailed description thereof will not be repeated.

As illustrated in FIG. 7, the inspection device 10 according to the present exemplary embodiment has the function of an edge extraction unit 21 in comparison to the first exemplary embodiment.

The edge extraction unit 21 executes a process of extracting an edge of each of a correct image and a target image based on the image information of each of the correct image and the target image, so as to generate edge information. In a case where the edge extraction unit extracts the edges of each of the correct image and the target image, the edge extraction unit may change an extraction threshold value used in a case of extracting the edges by using object information. For example, the edge extraction unit changes the extraction threshold value to a value predetermined for each type of object. Specifically, in a case where the object information indicates text and graphics, the extraction threshold value for the edge is set to a value higher than the threshold value of an image. In a case where the object information indicates an image, the extraction threshold value for the edge is set to a value lower than the threshold value of text and graphics. Thus, edge extraction in accordance with the characteristics of an object is performed.

In the present exemplary embodiment, the block collation unit 22 executes a process of detecting a defect by performing collation of an edge-extracted image between the correct image and the target image.

The edge extraction by the edge extraction unit 21 may be performed before the alignment of each block by the alignment unit 18 or before the resetting of the block by the block setting unit 20.

In a case where the block collation unit performs collation of the edge-extracted image between the correct image and the target image, the block collation unit 22 may change a threshold value for detecting a defect by using the edge information. For example, the block collation unit may change the threshold value depending on the degree of edge. Alternatively, the block collation unit may detect a defect with the threshold value that varies depending on whether or not an edge is provided. The block collation unit may change the threshold value for detecting a defect, by further using the object information. For example, the block collation unit may set the threshold value predetermined for each type of object such as text, graphic, or an image. Specifically, since erroneous detection of a defect is more likely to occur at the edge portion of text and graphics than an image, the threshold value may be set to be higher than the threshold value of the image, and thereby detection of a defect may have a difficulty.

Figure 8:
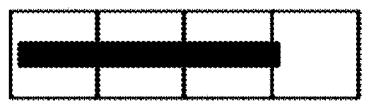
FIG. 8 is a diagram illustrating an example in which, in a case where a block of a target image is shifted from a correct image by (−3 pixels), a region corresponding to 3 pixels is left behind from a rightmost block, and, in a case where an image of a frame edge portion and the like of an edge image remains in the left-behind region, the image of the frame edge portion disappears.
Figure 8:
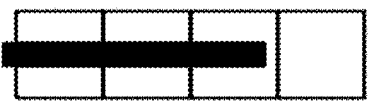
Figure 8:
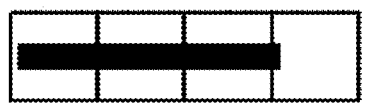
Figure 8:
Figure 8:
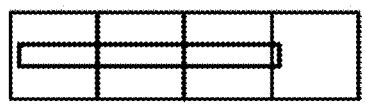
Figure 8:
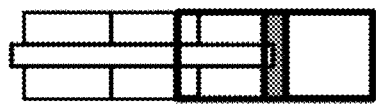
Figure 8:
Figure 8:
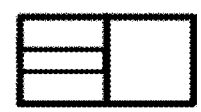
Figure 8:
Figure 8:
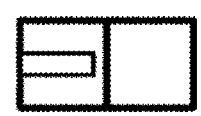

In a case where the edge extraction is performed as in the present exemplary embodiment, and in a case where the correct image and the target image are simply divided into blocks and collated as in the related art, the target image is moved by the misalignment of the target image, and then is collated with the correct image. Thus, in a case where the remaining block includes a frame edge portion or the like of an edge image, the image of the frame edge portion of the edge image disappears. For example, as illustrated in FIG. 8, in a case where the block of a target image is shifted from a correct image by (−3 pixels) (3 pixels in the left direction of FIG. 8), and collation is performed after the alignment for each block in order from the left side in FIG. 8, a region of 3 pixels is left behind from the rightmost block. In a case where the image of the frame edge portion or the like of the edge image is provided in the left-behind region, the image of the frame edge portion disappears.

Thus, similar to the first exemplary embodiment, the block setting unit 20 sets a region including 3 pixels corresponding to the movement amount of the alignment, as a block based on the alignment result of each block by the alignment unit 18, and then the collation is performed. In this manner, no region is left behind, and disappearing of the image is prevented.

Figure 9:
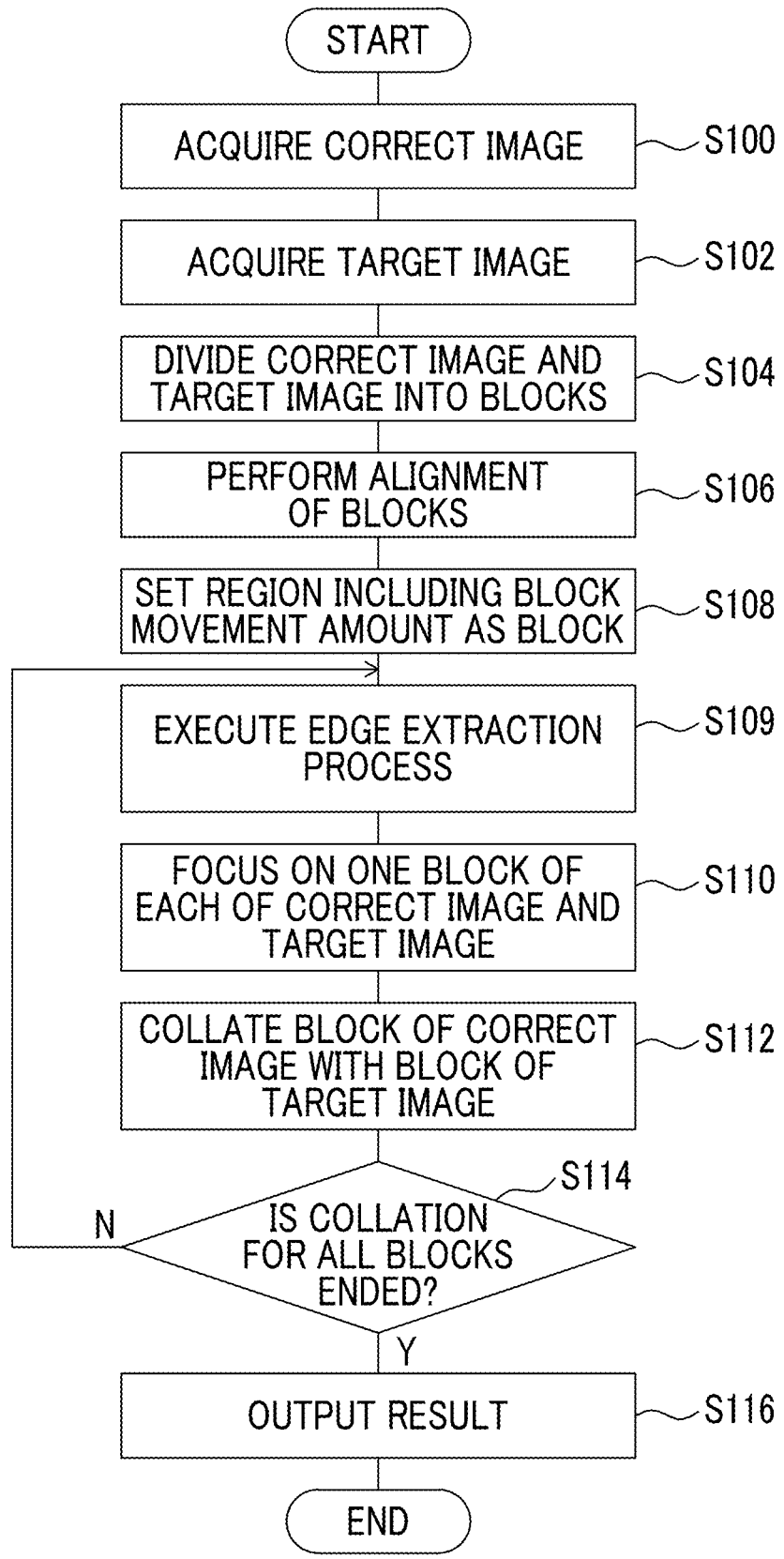
FIG. 9 is a flowchart illustrating an example of a flow of a process executed by the inspection device according to the second exemplary embodiment.

Next, a specific process executed by the inspection device 10 configured as described according to the present exemplary embodiment will be described. FIG. 9 is a flowchart illustrating an example of a flow of a process executed by the inspection device 10 according to the second exemplary embodiment. The process in FIG. 9 is started in a case where an instruction to start the inspection is issued, for example, by an operation of the operation unit 10E or the like. Processes identical to the processes in FIG. 6 will be described with the identical reference signs.

In Step S100, the CPU 10A acquires a correct image and proceeds to Step S102. That is, the correct image acquisition unit 12 acquires the image information of the correct image generated in advance.

In Step S102, the CPU 10A acquires a target image and proceeds to Step S104. That is, the target image acquisition unit 14 acquires image information indicating a target image obtained by reading a recording medium such as a paper, on which an image has been formed based on the image information of the correct image generated in advance. The order of Step S100 and Step S102 may be reversed.

In Step S104, the CPU 10A divides the correct image and the target image into blocks and proceeds to Step S106. That is, the block division unit 16 executes a process of dividing each of the correct image and the target image into blocks having a predetermined size.

In Step S106, the CPU 10A aligns the blocks of the correct image and the target image, and proceeds to Step S108. That is, the alignment unit 18 aligns the correct image and the target image for each block divided by the block division unit 16.

In Step S108, the CPU 10A sets a region including the movement amount of the block by the alignment, as a block, and proceeds to Step S109. That is, the block setting unit 20 resets the region including the movement amount of the alignment as the block, based on the alignment result of the alignment unit 18.

In Step S109, the CPU 10A executes an edge extraction process for each of the correct image and the target image, and proceeds to Step S110.

In Step S110, the CPU 10A proceeds to Step S112 focusing on one block corresponding to each of the correct image and the target image.

In Step S112, the CPU 10A collates the block of the correct image with the block of the target image and proceeds to Step S114. That is, the block collation unit 22 executes a process of detecting a defect by collating the correct image with the target image for each block set by the block setting unit 20. In the present exemplary embodiment, the defect of the image is detected by collating an edge-extracted block of the correct image and an edge-extracted block of the target image.

In Step S114, the CPU 10A determines whether or not the collation between the correct image and the target image for all the blocks is ended. In a case where the CPU determines that the collation for all the blocks is not ended, the process returns to Step S110 and the above process is repeated for the next block. In a case where the CPU determines that the collation for all the blocks is ended, the process proceeds to Step S116.

In Step S116, the CPU 10A outputs a defect detection result and ends a series of processes of the inspection device 10.

Figure 10:
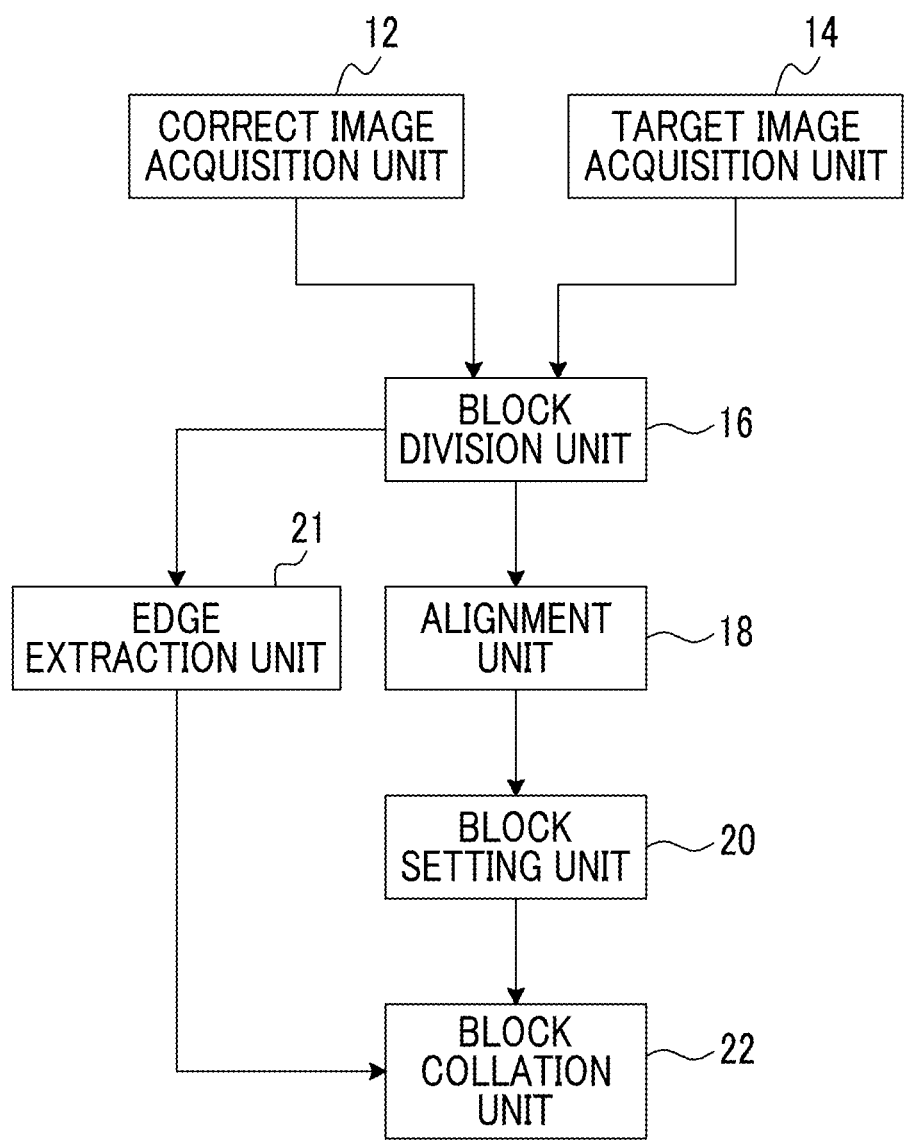
FIG. 10 is a functional block diagram illustrating a functional configuration of the inspection device in a modification example according to the second exemplary embodiment.

In the second exemplary embodiment, in a case where the CPU includes a plurality of processor cores, the edge extraction process by the edge extraction unit 21 may be executed in parallel to the respective processes of the alignment unit 18 and the block setting unit 20 as illustrated in FIG. 10. FIG. 10 is a functional block diagram illustrating a functional configuration of the inspection device 10 in a modification example according to the second exemplary embodiment. In FIG. 10, the identical reference signs are denoted by components common to the components in FIG. 2.

As illustrated in FIG. 10, the processing time is reduced by executing the edge extraction process by the edge extraction unit 21 in parallel to the respective processes of the alignment unit 18 and the block setting unit 20.

The inspection device 10 according to each of the above exemplary embodiments may be included in an image forming apparatus having the functions of a printing device and a reading device. Alternatively, the inspection device 10 may be included in the image forming apparatus having the function of the printing device or the reading device.

Figure 11:
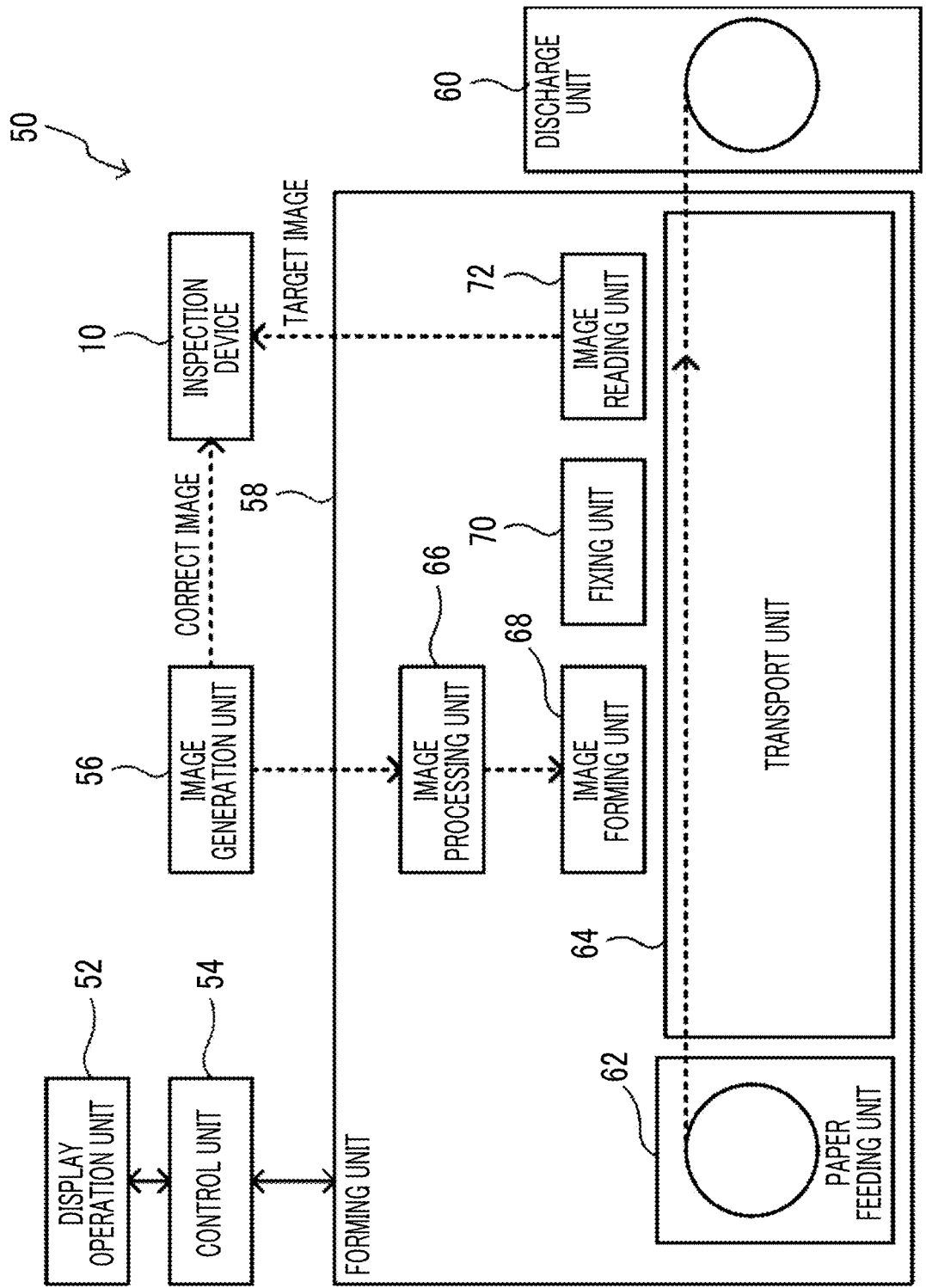
FIG. 11 is a block diagram illustrating an example of a configuration of an image forming apparatus in a case where the image forming apparatus having functions of a printing device and a reading device includes the inspection device according to the above exemplary embodiments.

Here, a configuration of an image forming apparatus in a case where the image forming apparatus 50 having the functions of the printing device and the reading device includes the inspection device 10 will be described. FIG. 11 is a block diagram illustrating an example of the configuration of the image forming apparatus in a case where the image forming apparatus 50 having the functions of the printing device and the reading device includes the inspection device 10 according to the present exemplary embodiment.

As illustrated in FIG. 11, the image forming apparatus 50 includes a display operation unit 52, a control unit 54, an image generation unit 56, a forming unit 58, and an discharge unit 60.

The display operation unit 52 includes a display unit made of liquid crystal and the like and an operation unit for performing various settings related to image formation. For example, the display operation unit 52 is operated to perform various settings such as various conditions for image formation and the type of recording medium for image formation.

The control unit 54 collectively controls the units of the image forming apparatus 50, and controls the units of the image forming apparatus 50 in accordance with the contents set in the display operation unit 52. The control unit 54 is configured by, for example, a microcomputer including a CPU, a ROM, a RAM, and an input/output unit. A program for controlling the operation for forming an image is stored in the ROM in advance. The operation of each unit in the image forming apparatus 50 is controlled by developing the program into the RAM and the CPU executing the program.

The image generation unit 56 generates image information indicating an original image by reading the original image. Alternatively, the image generation unit generates image information of an original image to be image-formed, by acquiring image information transmitted from an external computer. The inspection device 10 acquires the image information generated by the image generation unit 56, as a correct image.

The forming unit 58 includes a paper feeding unit 62, a transport unit 64, an image processing unit 66, an image forming unit 68, a fixing unit 70, and an image reading unit 72 as a reading unit.

The paper feeding unit 62 accommodates recording paper as the recording medium, and supplies the recording paper to the transport unit 64. For example, the paper feeding unit 62 accommodates roll-shaped recording paper, and the recording paper is pulled out and supplied to the transport unit. Alternatively, the paper feeding unit 62 includes a plurality of accommodation portions for accommodating sheets of paper of different sizes and types. The paper is pulled out from the main portion and supplied to the transport unit. In this case, the paper set by the display operation unit 52 or the like is supplied from each accommodation portion to the transport unit 64. In a case where the image information is acquired from the outside, the paper of the type designated from the outside is supplied from each accommodation portion to the transport unit 64.

The transport unit 64 transports the recording paper or the paper supplied by the paper feeding unit 62 to a position at which an image is formed on the recording paper or the paper, and transports the recording paper or the paper on which the image has been formed, to the discharge unit 60.

The image processing unit 66 receives image information which is generated by the image generation unit 56 or is received from the outside by the image generation unit 56, executes image processing for processing of the image forming unit 68, and outputs image information after the image processing to the image forming unit 68.

The image forming unit 68 receives the image information from the image processing unit 66 and forms an image indicated by the image information, on the recording paper or the paper. For example, the image forming unit 68 may employ an electrophotographic method to transfer the image to the recording paper or the paper, or may employ an inkjet method or the like to form an image by ejecting an ink onto the recording paper or the paper.

The fixing unit 70 executes a process for fixing the image on the recording paper. As the process for fixing the image, the image is fixed on the recording paper or the paper by executing at least one process of pressurization and heating on the recording paper or the paper on which the image has been formed.

The image reading unit 72 reads the recording paper or the paper on which the image has been formed, and acquires image information for performing various corrections (for example, misalignment correction and color correction). The inspection device 10 acquires the image information obtained by reading of the image reading unit 72.

The discharge unit 60 winds and accommodates the image-formed recording paper in a roll shape. Alternatively, the discharge unit discharges the image-formed paper.

In the above exemplary embodiments, an example in which the alignment between the correct image and the target image is performed for each of the blocks divided by the block division unit 16 has been described, but the present disclosure is not limited to this. For example, the alignment between the entirety of the correct image and the entirety of the target image may be performed by performing affine transformation or the like, and then the alignment may be performed for each block.

In the above exemplary embodiments, an example in which the digital image information as the base of image formation is used as the correct image, and the image information obtained by performing image formation based on the image information of the correct image and then reading a recording medium such as paper is set as the target image for the inspection has been described. The exemplary embodiments may be applied to an inspection device that performs an AA (analog-analog) inspection in which image information obtained by reading a correct image as a predetermined reference is used as the correct image instead of the digital correct image.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processes executed by the inspection device 10 according to the above exemplary embodiments may be processes executed by software, processes executed by hardware, or a combination of both cases. The processes executed by the units of the inspection device 10 may be stored in a storage medium as a program and distributed.

The present invention is not limited to the above description, and can be variously modified and implemented in a range without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inspection device comprising:
   a processor configured to
      acquire image information of each of a correct image and a target image as an inspection target,
      divide each of the correct image and the target image into blocks of a first size and perform alignment for each of the blocks of the first size by using the acquired image information, and
      set a region including a movement amount of the alignment as a block of a second size and detect a defect by collating the correct image and the target image for each block of the region,
wherein the second size is bigger than the first size.

2. The inspection device according to claim 1, wherein the processor is configured to further perform alignment for an entirety of the image before performing the alignment for each block of the region.

3. The inspection device according to claim 2, wherein the processor is configured to
further extract edge information of each of the correct image and the target image, and
detect the defect by collating the extracted edge information of the correct image and the extracted edge information of the target image.

4. The inspection device according to claim 3, wherein the processor is configured to change a threshold value for detecting the defect by using the edge information, and detect the defect.

5. The inspection device according to claim 4, wherein the processor is configured to change the threshold value further by using object information of the correct image.

6. The inspection device according to claim 5, wherein the processor is configured to execute, in parallel, a process of dividing each of the correct image and the target image into the blocks of the first size, performing alignment for each of the blocks of the first size, and setting the region including the movement amount of the alignment as the block of the second size, and a process of extracting the edge information.

7. The inspection device according to claim 3, wherein the processor is configured to execute, in parallel, a process of dividing each of the correct image and the target image into the blocks of the first size, performing alignment for each of the blocks of the first size, and setting the region including the movement amount of the alignment as the block of the second size, and a process of extracting the edge information.

8. The inspection device according to claim 4, wherein the processor is configured to execute, in parallel, a process of dividing each of the correct image and the target image into the blocks of the first size, performing alignment for each of the blocks of the first size, and setting the region including the movement amount of the alignment as the block of the second size, and a process of extracting the edge information.

9. The inspection device according to claim 3, wherein the processor is configured to
change an extraction threshold value used for extracting the edge information by using object information of the correct image, and
extract the edge information.

10. The inspection device according to claim 1, wherein the processor is configured to
further extract edge information of each of the correct image and the target image, and
detect the defect by collating the extracted pieces of the edge information of the correct image and the target image with each other.

11. The inspection device according to claim 10, wherein the processor is configured to change a threshold value for detecting the defect by using the edge information, and detect the defect.

12. The inspection device according to claim 11, wherein the processor is configured to change the threshold value further by using object information of the correct image.

13. The inspection device according to claim 12, wherein the processor is configured to execute, in parallel, a process of dividing each of the correct image and the target image into the blocks of the first size, performing alignment for each of the blocks of the first size, and setting the region including the movement amount of the alignment as the block of the second size, and a process of extracting the edge information.

14. The inspection device according to claim 11, wherein the processor is configured to execute, in parallel, a process of dividing each of the correct image and the target image into the blocks of the first size, performing alignment for each of the blocks of the first size, and setting the region including the movement amount of the alignment as the block of the second size, and a process of extracting the edge information.

15. The inspection device according to claim 11, wherein the processor is configured to
change an extraction threshold value used for extracting the edge information by using object information of the correct image, and
extract the edge information.

16. The inspection device according to claim 10, wherein the processor is configured to execute, in parallel, a process of dividing each of the correct image and the target image into the blocks of the first size, performing alignment for each of the blocks of the first size, and setting the region including the movement amount of the alignment as the block of the second size, and a process of extracting the edge information.

17. The inspection device according to claim 10, wherein the processor is configured to
change an extraction threshold value used for extracting the edge information by using object information of the correct image, and
extract the edge information.

18. The inspection device according to claim 17, wherein the processor is configured to change the extraction threshold value to a value predetermined for each type of object.

19. An image forming apparatus comprising:
the inspection device according to claim 1;
an image forming unit that forms an image on a recording medium by using the image information of the correct image generated in advance; and
a reading unit that reads the recording medium on which the image is formed by the image forming unit, to generate the image information of the target image.

20. A non-transitory computer readable medium storing an inspection program causing a computer to execute:
acquiring image information of each of a correct image and a target image as an inspection target;
dividing each of the correct image and the target image into blocks of a first size and performing alignment for each of the blocks of the first size by using the acquired image information; and
setting a region including a movement amount of the alignment as a block of a second size and detecting a defect by collating the correct image and the target image for each block of the region,
wherein the second size is bigger than the first size.

* * * * *